(12) United States Patent
Zhang et al.

(10) Patent No.: US 11,902,966 B2
(45) Date of Patent: Feb. 13, 2024

(54) METHODS FOR SL SR/BSR HANDLING (71) Applicant: Telefonaktiebolaget LM Ericsson (publ), Stockholm (SE)

(72) Inventors: Zhang Zhang, Beijing (CN); Congchi Zhang, Shanghai (CN); Marco Belleschi, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 146 days.

(21) Appl. No.: 17/441,494

(22) PCT Filed: Mar. 19, 2020

(86) PCT No.: PCT/EP2020/057548
§ 371 (c)(1),
(2) Date: Sep. 21, 2021

(87) PCT Pub. No.: WO2020/193342
PCT Pub. Date: Oct. 1, 2020

(65) Prior Publication Data
US 2022/0183031 A1 Jun. 9, 2022

(30) Foreign Application Priority Data
Mar. 27, 2019 (WO) ............... PCT/CN2019/079947

(51) Int. Cl.
*H04W 72/1268* (2023.01)
*H04W 28/02* (2009.01)
*H04W 72/23* (2023.01)

(52) U.S. Cl.
CPC ... *H04W 72/1268* (2013.01); *H04W 28/0278* (2013.01); *H04W 72/23* (2023.01)

(58) Field of Classification Search
None
See application file for complete search history.

(56) References Cited

U.S. PATENT DOCUMENTS

| 2016/0128094 A1* | 5/2016 | Lee | ............... | H04W 72/21 |
| | | | | 370/329 |
| 2016/0135217 A1* | 5/2016 | Lee | ............... | H04L 47/30 |
| | | | | 370/329 |

(Continued)

FOREIGN PATENT DOCUMENTS

| CN | 105992364 A | 10/2016 |
| CN | 107079469 A | 8/2017 |

(Continued)

OTHER PUBLICATIONS

LG Electronics Inc., "SR cancellation for ProSe communication", 3GPP TSG-RAN WG2 Meeting #88, R2-145038, San Francisco, USA, Nov. 17-Nov. 21, 2014, pp. 1-5.

(Continued)

*Primary Examiner* — Clemence S Han
(74) *Attorney, Agent, or Firm* — Murphy, Bilak & Homiller, PLLC (57) ABSTRACT

The embodiments herein relate to methods for SL SR/BSR handling. In one embodiment, there proposes a method in a wireless device, comprising: triggering a Sidelink (SL) Buffer Status Report (BSR) in response to data to be sent over the SL; triggering a Sidelink (SL) Scheduling Request (SR) for transmitting the SL BSR, wherein the SL BSR is intended to be transmitted by using a first uplink (UL) grant triggered by the SL SR; and cancelling the SL SR transmission if the SL BSR has been transmitted by using a second UL grant triggered by other sources. With embodiments herein, the LCP can be adapted based on QoS requirement and unsuitable cancel of sidelink BSR can be avoided, which improves performance of both UL and sidelink.

19 Claims, 3 Drawing Sheets

(56) References Cited

U.S. PATENT DOCUMENTS

| | | | |
|---|---|---|---|
| 2017/0223568 A1 | 8/2017 | Xu et al. | |
| 2017/0245245 A1* | 8/2017 | Kim | H04W 72/21 |
| 2017/0289908 A1* | 10/2017 | Lee | H04W 52/0216 |
| 2017/0310531 A1 | 10/2017 | Dinan | |
| 2018/0054804 A1 | 2/2018 | Luo et al. | |
| 2018/0317123 A1* | 11/2018 | Chen | H04W 72/21 |
| 2019/0239112 A1* | 8/2019 | Rao | H04W 72/20 |
| 2019/0350045 A1* | 11/2019 | Lee | H04W 4/40 |
| 2020/0196327 A1* | 6/2020 | Zhang | H04W 72/21 |
| 2020/0229198 A1* | 7/2020 | Kung | H04W 72/54 |
| 2020/0267753 A1* | 8/2020 | Adjakple | H04W 72/1268 |
| 2021/0058820 A1* | 2/2021 | Lee | H04W 28/0268 |
| 2021/0153065 A1* | 5/2021 | Adjakple | H04W 76/14 |
| 2021/0274545 A1* | 9/2021 | Adjakple | H04W 72/21 |

FOREIGN PATENT DOCUMENTS

| | | | |
|---|---|---|---|
| EP | 3244677 A1 | 11/2017 | |
| JP | 2017538374 A | 12/2017 | |
| WO | 2009116939 A2 | 9/2009 | |
| WO | 2016072590 A1 | 5/2016 | |
| WO | 2016083487 A1 | 6/2016 | |
| WO | 2017194212 A1 | 11/2017 | |

OTHER PUBLICATIONS

"SR cancellation for URLLC service", 3GPP TSG-RAN WG2 Meeting #105, R2-1900843, Athens, Greece (resubmission of R2-1816944), Feb. 25-Mar. 1, 2019, pp. 1-4.

* cited by examiner

METHODS FOR SL SR/BSR HANDLING

TECHNICAL FIELD

The embodiments herein relate generally to the field of wireless communication, and more particularly, the embodiments herein relate to methods for Sidelink (SL) Scheduling Request (SR)/Buffer Status Report (BSR) handling.

BACKGROUND

V2X

In Rel-14 and Rel-15, the extensions for the device-to-device work consist of support of V2X communication, which includes any combination of direct communication between vehicles, pedestrians and infrastructure. V2X communication may take advantage of a network (NW) infrastructure, when available, but at least basic V2X connectivity should be possible even in case of lack of coverage. Providing an LTE-based V2X interface may be economically advantageous because of the LTE economies of scale and it may enable tighter integration between communications with the NW infrastructure (V2I), pedestrian (V2P) and other vehicles (V2V), as compared to using a dedicated V2X technology (e.g. IEEE 802.11p).

V2X communications may carry both non-safety and safety information, where each of the applications and services may be associated with specific requirements sets, e.g., in terms of latency, reliability, data rates etc.

There are several different use cases defined for V2X:
  V2V (vehicle-to-vehicle): covering LTE-based communication between vehicles, either via the cellular interface (known as Uu) or via the sidelink interface (known as PC5).
  V2P (vehicle-to-pedestrian): covering LTE-based communication between a vehicle and a device carried by an individual (e.g. handheld terminal carried by a pedestrian, cyclist, driver or passenger), either via Uu or sidelink (PC5)
  V2I/N (vehicle-to-infrastructure/network): covering LTE-based communication between a vehicle and a roadside unit/network. A roadside unit (RSU) is a transportation infrastructure entity (e.g. an entity transmitting speed notifications) that communicates with V2X capable UEs over sidelink (PC5) or over Uu. For V2N, the communication is performed on Uu.

3GPP SA1 working group has completed new service requirements for future V2X services. For these advanced V2X applications, the expected requirements to meet the needed data rate, capacity, reliability, latency, communication range and speed are made more stringent. In Release 16, 3GPP has started to study and specify V2X communication using New Radio (NR).

Sidelink Resource Allocation

There are two different resource allocation (RA) procedures for V2X on sidelink, i.e. centralized RA (so called "mode 3" in LTE and "mode 1" in NR) and autonomous RA (so called "mode 4" in LTE and "mode 2" in NR). The transmission resources are selected within a resource pool which is predefined or configured by the network (NW).

For mode 2 or mode 4, there are two fundamental features for achieving a well-functioning distributed operation: semi-persistent transmission and sensing-based resource allocation. Semi-persistent transmission is based on the fact that the UE can predict with reasonable accuracy the arrival of new packets to the transmission buffer. This is so because LTE V2X was mainly designed to support periodic transmissions such as CAM. Using appropriate signaling, a first UE performing transmissions can notify all other UEs about its intention to transmit on specific radio resources at a certain time in the future. Using a sensing algorithm, a second UE can learn the presence of these semi-persistent transmissions. This information can be used by the second UE when selecting radio resources. In this way collisions between UEs can be mitigated.

In mode 1 or mode 3, the UEs are controlled by the NW. Typical transmissions by a mode 1 or mode 3 UE are performed as follows:

1. The UE requests resources for sidelink transmissions to the NW by sending sidelink buffer status report (SL BSR) in uplink (UL).
2. The NW grants resources for sidelink transmission to the UE.
3. The UE performs the sidelink transmission on the resources granted by the NW.

The grant provided by the NW may be valid for the transmission of a single transport block (TB), including its retransmission; or for the transmission of multiple TBs if it is a configured scheduling grant.

UL Logical Channel Prioritization (LCP)

The Logical Channel Prioritization procedure is applied when a new transmission is performed and it is used by the UE to determine which information should be prioritized when filling in a UL grant.

Specifically, for the Logical Channel Prioritization procedure, the MAC entity shall take into account the following relative priority in decreasing order:
  C-RNTI MAC control element (CE) or data from UL-CCCH;
  Configured Grant Confirmation MAC CE;
  MAC CE for UL buffer status report (BSR), with exception of UL BSR included for padding;
  Single Entry power headroom report (PHR) MAC CE or Multiple Entry PHR MAC CE;
  MAC CE for Sidelink BSR, with exception of Sidelink BSR included for padding;
  Data from any Logical Channel, except data from UL-CCCH;
  MAC CE for UL BSR included for padding
  MAC CE for Sidelink BSR included for padding.

Buffer Status Report (BSR)

The BSR procedure is used to provide the serving gNB with information about UL and/or sidelink data volume in the MAC entity.

A UL BSR shall be triggered if any of the following events occur:
  The MAC entity has new UL data available for a logical channel which belongs to an LCG; and either
    The new UL data belongs to a logical channel with higher priority than the priority of any logical channel containing available UL data which belong to any logical channel group (LCG); or
    None of the logical channels which belong to an LCG contains any available UL data.
  In which case the BSR is referred to as 'Regular UL BSR';
  UL resources are allocated and number of padding bits is equal to or larger than the size of the Buffer Status Report MAC CE plus its subheader, in which case the BSR is referred to as Padding UL BSR';
  retxBSR-Timer expires, and at least one of the logical channels which belong to an LCG contains UL data, in which case the BSR is referred to as 'Regular UL BSR';

periodicBSR-Timer expires, in which case the BSR is referred to as 'Periodic UL BSR'.

A sidelink BSR shall be triggered if any of the following events occur:

The MAC entity has new sidelink data available for a logical channel which belongs to an LCG; and either
The new sidelink data belongs to a logical channel of a ProSe Destination, where the logical channel has higher priority than the priority of any logical channel containing available sidelink data which belongs to any LCG of the same ProSe Destination; or
None of the logical channels which belong to an LCG of the same ProSe Destination contains any available sidelink data.
In which case the BSR is referred to as 'Regular sidelink BSR';
UL resources are allocated and number of padding bits is equal to or larger than the size of the sidelink BSR MAC CE plus its subheader, in which case the BSR is referred to as Padding sidelink BSR';
retxBSR-TimerSL expires, and at least one of the logical channels which belong to an LCG contains sidelink data, in which case the BSR is referred to as 'Regular sidelink BSR';
periodicBSR-TimerSL expires, in which case the BSR is referred to as 'Periodic sidelink BSR'

All triggered UL/sidelink BSRs may be cancelled when the UL/sidelink grant(s) can accommodate all pending data available for transmission but is not sufficient to additionally accommodate the UL/sidelink BSR MAC CE plus its subheader. All UL/sidelink BSRs triggered prior to MAC PDU assembly shall be cancelled when a MAC PDU which includes a UL/sidelink BSR MAC CE is transmitted. In addition, for sidelink all triggered Sidelink BSRs shall be cancelled when upper layers configure autonomous resource selection.

Scheduling Request (SR)

When a BSR is triggered due to new UL data available for transmission, it will be sent to the NW via PUSCH using UL grant. In case there are not enough available resources for BSR transmission, a SR will be triggered. SR is transmitted via PUCCH and multiple SR configurations are supported for NR Uu. After receiving the SR, NW will send a grant to UE via DCI, and the grant size should be enough for at least the BSR. The SR configuration of the logical channel that triggered the BSR (if such a configuration exists) is considered as corresponding SR configuration for the triggered SR.

In NR, SL dedicated SR of multiple configurations is also supported. It implies that when a SL BSR is triggered, due to SL data availability in the UE SL buffer, and there are not enough resources to transmit it over Uu, a SL SR will be triggered via PUCCH following SL SR configuration.

Hence, in NR two types of SR will coexist over Uu. The ordinary SR, referred to as UL SR in this disclosure, used to request UL resources and the SL SR used to request SL resources. In this way, the NW can distinguish the scheduling requests for SL from those for UL.

US 2016/0128094 A1 discloses canceling scheduling requests triggered by a sidelink buffer status report in a D2D (device to device) communication system.

WO 2016/072590 A1 also discloses canceling a scheduling request triggered by a sidelink buffer status report in a D2D communication system.

3GPP Draft R2-145038 "SR cancellation for ProSe communication", dated 17 Nov. 2014 discloses cancelling pending scheduling requests.

SUMMARY

Currently in UL logical channel, priority is statically configured by RRC, i.e. UL BSR is always prioritized over sidelink (SL) BSR, and BSR with exception of BSR included for padding is always prioritized over UL data transmission except data from UL-CCCH. This may not be optimal/suitable. For instance, when sidelink data has high QoS requirement and/or is safety related, it may not be good to prioritize UL BSR over sidelink BSR; when UL data has high QoS requirement. It may not be good to prioritize BSR over UL data transmission.

Besides, when simultaneous mode 1 and mode 2 transmission is supported, it is not always suitable to cancel Sidelink BSRs when upper layers configure autonomous resource selection.

In case of UL SRs and SL SRs of multiple configurations coexistence, there is no need to transmit the triggered Uu/SL SR if the corresponding BSRs are already sent via Uu grant which is caused by previous SR.

In view of above problem in the prior art, the embodiments herein propose methods to properly adapt UL LCP taking QoS requirement into account, instead of static LCP configuration. The adaptation applies to prioritization between UL BSR and SL BSR, UL BSR and UL data, and SL BSR and UL data. Besides, the Sidelink BSRs are cancelled only when upper layers de-configure NW controlled resource selection, and this could be performed per MAC entity. Additionally, the embodiments herein proposes methods to handle the coexistence of SL SR and UL SR to minimize UL resource consumption.

In one embodiment, there proposes a method in a wireless device, comprising: triggering a Sidelink (SL) Buffer Status Report (BSR) in response to data to be sent over the SL; triggering a Sidelink (SL) Scheduling Request (SR) for transmitting the SL BSR, wherein the SL BSR is intended to be transmitted by using a first uplink (UL) grant triggered by the SL SR; and cancelling the SL SR transmission if the SL BSR has been transmitted by using a second UL grant triggered by other sources.

In one embodiment, in the method, the SL BSR has been transmitted by using the second UL grant triggered by the Uu SR, and the Uu SR is triggered by a Uu BSR, which is triggered in turn by data to be sent over the Uu interface.

In one embodiment, in the method, the SL BSR and the Uu BSR has been transmitted together by using the second UL grant triggered by the Uu SR.

In one embodiment, the method further comprising: determining Logical Channel Prioritization (LCP) for at least the Uu BSR and the SL BSR; and transmitting the Uu BSR and/or the SL BSR according to the determined LCP.

In one embodiment, in the method, the LCP is determined based on Quality of Service (QoS) requirement of the Uu BSR and the SL BSR, and the QoS requirement includes priority requirement and/or latency requirement.

In one embodiment, in the method, the QoS requirement of the Uu BSR is the highest QoS requirement of the logical channels included in the Uu BSR; and the QoS requirement of the SL BSR is the highest QoS requirement of the logical channels included in the SL BSR.

In one embodiment, in the method, the SL BSR is prioritized than the Uu BSR if the QoS requirement of the SL BSR is higher than the QoS requirement of the Uu BSR.

In one embodiment, in the method, the SL BSR is prioritized than the Uu BSR if the QoS requirement of the SL BSR is higher than a threshold. In one embodiment, in the method, the threshold is preconfigured or configured by a network node via common or dedicated signalling.

In one embodiment, in the method, the SL BSR has been transmitted by using a third UL grant triggered by a second SL SR with a different configuration.

In one embodiment, in the method, the SL SR is transmitted without being cancelled, and the SL BSR and/or the Uu BSR is transmitted by using the first UL grant triggered by the Uu SR.

In one embodiment, there proposes a wireless device, comprising: at least one processor; and a non-transitory computer readable medium coupled to the at least one processor, the non-transitory computer readable medium contains instructions executable by the at least one processor, whereby the at least one processor is configured to: trigger a Sidelink (SL) Buffer Status Report (BSR) in response to data to be sent over the SL; trigger a Sidelink (SL) Scheduling Request (SR) for transmitting the SL BSR, wherein the SL BSR is intended to be transmitted by using a first uplink (UL) grant triggered by the SL SR; and cancel the SL SR transmission if the SL BSR has been transmitted by using a second UL grant triggered by other sources.

In one embodiment, in the wireless device, the SL BSR has been transmitted by using the second UL grant triggered by the Uu SR, and the Uu SR is triggered by a Uu BSR, which is triggered in turn by data to be sent over the Uu interface.

In one embodiment, in the wireless device, the SL BSR and the Uu BSR has been transmitted together by using the second UL grant triggered by the Uu SR.

In one embodiment, in the wireless device, the at least one processor is further configured to: determine Logical Channel Prioritization (LCP) for at least the Uu BSR and the SL BSR; and transmit the Uu BSR and/or the SL BSR according to the determined LCP.

In one embodiment, in the wireless device, the LCP is determined based on Quality of Service (QoS) requirement of the Uu BSR and the SL BSR, and the QoS requirement includes priority requirement and/or latency requirement.

In one embodiment, in the wireless device, the QoS requirement of the Uu BSR is the highest QoS requirement of the logical channels included in the Uu BSR; and the QoS requirement of the SL BSR is the highest QoS requirement of the logical channels included in the SL BSR.

In one embodiment, in the wireless device, the SL BSR is prioritized than the Uu BSR if the QoS requirement of the SL BSR is higher than the QoS requirement of the Uu BSR.

In one embodiment, in the wireless device, the SL BSR is prioritized than the Uu BSR if the QoS requirement of the SL BSR is higher than a threshold.

In one embodiment, in the wireless device, the threshold is preconfigured or configured by a network node via common or dedicated signalling.

In one embodiment, in the wireless device, the SL BSR has been transmitted by using a third UL grant triggered by a second SL SR with a different configuration.

In one embodiment, in the wireless device, the SL SR is transmitted without being cancelled, and the SL BSR and/or the Uu BSR is transmitted by using the first UL grant triggered by the Uu SR.

In one embodiment, there proposes a computer readable medium comprising computer readable code, which when run on an apparatus, causes the apparatus to perform any of the above method.

With embodiments herein, the LCP can be adapted based on QoS requirement and unsuitable cancel of sidelink BSR can be avoided, which improves performance of both UL and sidelink.

BRIEF DESCRIPTION OF THE DRAWINGS

The accompanying drawings, which are incorporated herein and form part of the specification, illustrate various embodiments of the present disclosure and, together with the description, further serve to explain the principles of the disclosure and to enable a person skilled in the pertinent art to make and use the embodiments disclosed herein. In the drawings, like reference numbers indicate identical or functionally similar elements, and in which.

DETAILED DESCRIPTION OF EMBODIMENTS

Embodiments herein will be described in detail hereinafter with reference to the accompanying drawings, in which embodiments are shown. These embodiments herein may, however, be embodied in many different forms and should not be construed as being limited to the embodiments set forth herein. The elements of the drawings are not necessarily to scale relative to each other.

Reference to "one embodiment" or "an embodiment" means that a particular feature, structure or characteristic described in connection with the embodiment is included in at least one embodiment. Thus, the appearances of the phrase "in one embodiment" appearing in various places throughout the specification are not necessarily all referring to the same embodiment.

The term "A, B, or C" used herein means "A" or "B" or "C"; the term "A, B, and C" used herein means "A" and "B" and "C"; the term "A, B, and/or C" used herein means "A", "B", "C", "A and B", "A and C", "B and C" or "A, B, and C".

The embodiments herein propose methods to properly adapt UL LCP taking QoS requirement into account, instead of static LCP configuration. The adaptation applies to prioritization between UL BSR and SL BSR, UL BSR and UL data, and SL BSR and UL data. Besides, the Sidelink BSRs are cancelled only when upper layers de-configure NW controlled resource selection, and this could be performed per MAC entity. Additionally, the embodiments herein proposes methods to handle the coexistence of SL SR and UL SR to minimize UL resource consumption.

Figure 1:
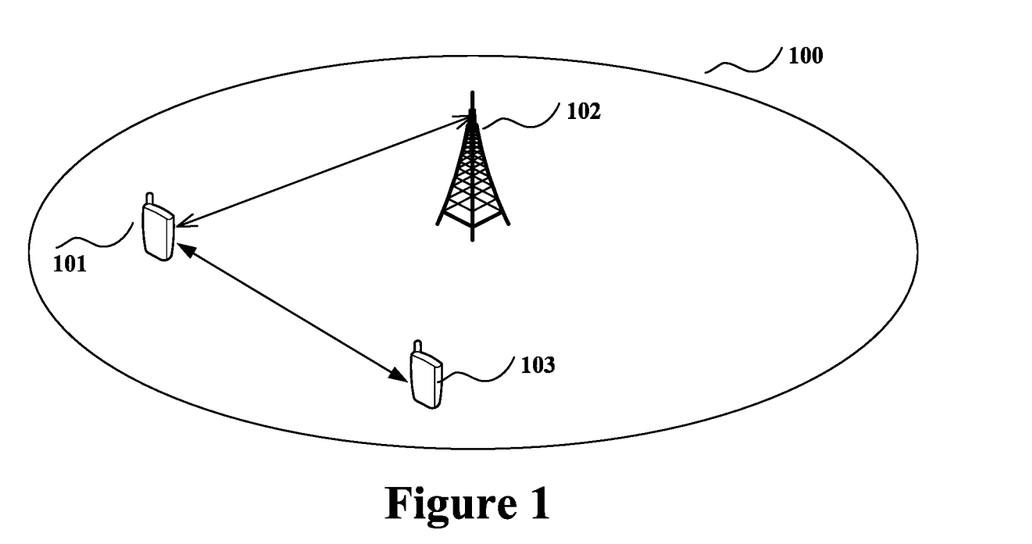
FIG. 1 is a schematic block diagram showing an example wireless communication system, in which the embodiments herein can be implemented.

FIG. 1 is a schematic block diagram showing an example wireless communication system 100, in which the embodiments herein can be implemented. The communication system 100 includes one or more wireless devices 101, 103 and one or more network nodes 102. Wireless devices 101, 103 may communicate with network nodes 102 over a wireless interface, such as Uu interface. The wireless device 101 may be carried by a user in a car, and thus may be a vehicle device. The wireless device 103 may be carried by a user in other vehicles, and thus may be a vehicle device. The wireless device 103 may be carried by a pedestrian, and thus may be a pedestrian device. The wireless device 103 may be a NW infrastructure device. There may be V2X communication such as V2I, V2P and V2V between the wireless device 101 and the wireless device 103 via sidelink (SL).

For example, wireless device 101 may transmit wireless signals to one or more of network nodes 102, and/or receive wireless signals from one or more of network nodes 102. Wireless device 101 may transmit wireless signals to wireless device 103, and/or receive wireless signals from wireless device 103. The wireless signals may contain voice traffic, data traffic, control signals, and/or any other suitable information. In some embodiments, an area of wireless signal coverage associated with a network node may be referred to as a cell. In some embodiments, wireless devices 101, 103 may have device-to-device (D2D) capability. Thus, wireless devices 101, 103 may be able to receive signals from and/or transmit signals directly to another wireless device.

As described above, example embodiments of network 100 may include one or more wireless devices 101, 103, and one or more different types of network nodes 102 capable of communicating (directly or indirectly) with wireless devices 101, 103.

In some embodiments, the non-limiting term wireless device is used. Wireless devices 101, 103 described herein can be any type of wireless device capable, configured, arranged and/or operable to communicate wirelessly with network nodes 102 and/or another wireless device, for example over radio signals. Communicating wirelessly may involve transmitting and/or receiving wireless signals using electromagnetic signals, radio waves, infrared signals, and/or other types of signals suitable for conveying information through air. In particular embodiments, wireless devices may be configured to transmit and/or receive information without direct human interaction. For instance, a wireless device may be designed to transmit information to a network on a predetermined schedule, when triggered by an internal or external event, or in response to requests from the network. Generally, a wireless device may represent any device capable of, configured for, arranged for, and/or operable for wireless communication, for example radio communication devices. Examples of wireless devices include, but are not limited to, user equipment (UEs) such as smart phones. Further examples include wireless cameras, wireless-enabled tablet computers, laptop-embedded equipment (LEE), laptop-mounted equipment (LME), USB dongles, and/or wireless customer-premises equipment (CPE). Wireless device 110 may also be a radio communication device, target device, D2D UE, machine-type-communication (MTC) UE or UE capable of machine-to-machine (M2M) communication, low-cost and/or low-complexity UE, a sensor equipped with UE, Tablet, mobile terminals, an Internet of Things (IoT) device, or a Narrowband IoT (NB-IOT) device, or any other suitable devices.

As one specific example, wireless devices 101, 103 may represent a UE configured for communication in accordance with one or more communication standards promulgated by the 3rd Generation Partnership Project (3GPP), such as 3GPP's Global System for New Radio (NR), Mobile Communications (GSM), Universal Mobile Telecommunications System (UMTS), Long Term Evolution (LTE), and/or other suitable 2G, 3G, 4G or 5G standards or other suitable standards. As used herein, a "UE" may not necessarily have a "user" in the sense of a human user who owns and/or operates the relevant device. Instead, a UE may represent a device that is intended for sale to, or operation by, a human user but that may not initially be associated with a specific human user.

Wireless devices 101, 103 may support D2D communication, for example by implementing a 3GPP standard for sidelink communication, and may in this case be referred to as a D2D communication device.

As yet another specific example, in an IoT scenario, a wireless device may represent a machine or other device that performs monitoring and/or measurements, and transmits the results of such monitoring and/or measurements to another wireless device and/or a network node. The wireless device may in this case be a M2M device, which may in a 3GPP context be referred to as a MTC device. As one particular example, the wireless device may be a UE implementing the 3GPP NB-IoT standard. Particular examples of such machines or devices are sensors, metering devices such as power meters, industrial machinery, or home or personal appliances (e.g., refrigerators, televisions, personal wearables such as watches, etc.). In other scenarios, a wireless device may represent a vehicle or other equipment that is capable of monitoring and/or reporting on its operational status or other functions associated with its operation.

Wireless devices 101, 103 as described above may represent the endpoint of a wireless connection, in which case the device may be referred to as a wireless terminal. Furthermore, a wireless device as described above may be mobile, in which case it may also be referred to as a mobile device or a mobile terminal.

As depicted in FIG. 1, wireless devices 101, 103 may be any type of wireless endpoint, mobile station, mobile phone, wireless local loop phone, smartphone, user equipment, desktop computer, Personal Digital Assistant (PDA), cell phone, tablet, laptop, Voice Over IP (VoIP) phone or handset, which is able to wirelessly send and receive data and/or signals to and from a network node, such as network node 102 and/or other wireless devices.

Wireless devices 101, 103 (e.g., an end station, a network device) may store and transmit (internally and/or with other electronic devices over a network) code (composed of software instructions) and data using machine-readable media, such as non-transitory machine-readable media (e.g., machine-readable storage media such as magnetic disks; optical disks; read-only memory (ROM); flash memory devices; phase change memory) and transitory machine-readable transmission media (e.g., electrical, optical, acoustical or other form of propagated signals, such as carrier waves, infrared signals). In addition, wireless devices 101, 103 may include hardware such as a set of one or more processors coupled to one or more other components, such as one or more non-transitory machine-readable media (to store code and/or data), user input/output devices (e.g., a keyboard, a touchscreen, and/or a display), and network connections (to transmit code and/or data using propagating signals). The coupling of the set of processors and other components is typically through one or more busses and bridges (also termed as bus controllers). Thus, a non-transitory machine-readable medium of a given electronic device typically stores instructions for execution on one or more processors of that electronic device. One or more parts of an embodiment described herein may be implemented using different combinations of software, firmware, and/or hardware.

Also, in some embodiments, generic terminology, "network node" is used. As used herein, "network node" refers to equipment capable, configured, arranged and/or operable to communicate directly or indirectly with a wireless device and/or with other equipment (e.g., another network node) in the wireless communication network that enable and/or provide wireless access to the wireless device. Examples of network nodes include, but are not limited to, access points (APs), in particular radio access points. A network node may represent base stations (BSs), such as radio base stations. Particular examples of radio base stations include Node Bs, evolved Node Bs (eNBs), Master eNB (MeNB), Secondary eNB (SeNB), and gNBs. Base stations may be categorized based on the amount of coverage they provide (or, stated differently, their transmit power level) and may then also be referred to as femto base stations, pico base stations, micro base stations, or macro base stations. "Network node" also includes one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base stations may also be referred to as nodes in a distributed antenna system (DAS).

Yet further examples of network nodes include a network node belonging to a Master Cell Group (MCG), a network node belonging to a Secondary Cell Group (SCG), multi-standard radio (MSR) radio equipment such as MSR BSs, network controllers such as radio network controllers (RNCs) or base station controllers (BSCs), base transceiver stations (BTSs), transmission points, transmission nodes, Multi-cell/multicast Coordination Entities (MCEs), core network nodes (e.g., Mobile Switching Centers (MSCs), Mobility Management Entities (MMEs), etc.), Operation and Maintenance (O&M) nodes, Operations Support System (OSS) nodes, Self-Organizing Network (SON) nodes, positioning nodes (e.g., Evolved Serving Mobile Location Center (E-SMLCs)), minimization of drive tests (MDTs), or any other suitable network node. More generally, however, network nodes may represent any suitable device (or group of devices) capable, configured, arranged, and/or operable to enable and/or provide a wireless device access to the wireless communication network or to provide some service to a wireless device that has accessed the wireless communication network.

Network nodes 102 may be a piece of networking equipment, including hardware and software, which communicatively interconnects other equipment on the network (e.g., wireless devices 101, 103, other network devices, end stations). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video). Subscriber end stations (e.g., servers, workstations, laptops, netbooks, palm tops, mobile phones, smartphones, multimedia phones, VOIP phones, user equipment, terminals, portable media players, GPS units, gaming systems, set-top boxes) access content/services provided over the Internet and/or content/services provided on virtual private networks (VPNs) overlaid on (e.g., tunneled through) the Internet. The content and/or services are typically provided by one or more end stations (e.g., server end stations) belonging to a service or content provider or end stations participating in a peer to peer service, and may include, for example, public webpages (e.g., free content, store fronts, search services), private webpages (e.g., username/password accessed webpages providing email services), and/or corporate networks over VPNs. Typically, subscriber end stations are coupled (e.g., through CPE coupled to an access network (wired or wirelessly)) to edge network devices, which are coupled (e.g., through one or more core network devices) to other edge network devices, which are coupled to other end stations (e.g., server end stations). One of ordinary skill in the art would realize that any network device, end station or other network apparatus can perform various functions described herein.

The term "node" may be used herein generically to refer both to wireless devices and network nodes, as each is respectively described above.

The terminology such as network node and wireless device should be considered non-limiting and does in particular not imply a certain hierarchical relation between the two; in general "network node" could be considered as a first device and "wireless device" as a second device, and these two devices communicate with each other over some radio channel. Example embodiments of wireless devices 101, 103, network nodes 102, and other network nodes (such as radio network controller or core network node) are described in more detail below with respect to FIGS. 2-5.

To solve the problem in the prior art, the following embodiments are proposed. The embodiments herein propose methods to properly adapt UL LCP taking QoS requirement into account, instead of static LCP configuration. The adaptation applies to prioritization between UL BSR and SL BSR, UL BSR and UL data, and SL BSR and UL data. Besides, the Sidelink BSRs are cancelled only when upper layers de-configure NW controlled resource selection, and this could be performed per MAC entity. Additionally, the embodiments herein proposes methods to handle the coexistence of SL SR and UL SR to minimize UL resource consumption.

With embodiments herein, the LCP can be adapted based on QoS requirement and unsuitable cancel of sidelink BSR can be avoided, which improves performance of both UL and sidelink. In particular, the embodiments in this disclosure may be applied to LTE, NR, or any RAT.

SR-Related Embodiments

New data available for transmission will trigger a corresponding UL/SL BSR, and will further trigger a corresponding UL/SL SR if there are not enough resources available for UL BSR or SL BSR transmission in Uu.

In one embodiment, the planned SL SR transmission is cancelled if the relevant SL BSR has been transmitted already using UL grant triggered by other sources. Due to the coexistence of SL/UL SRs with different configurations and SL/UL BSRs, it could be the case that before the SL SR transmission occur in a SL SR configured time/frequency resource, UE has already received a UL grant from the gNB and transmitted its SL BSR.

Figure 2:
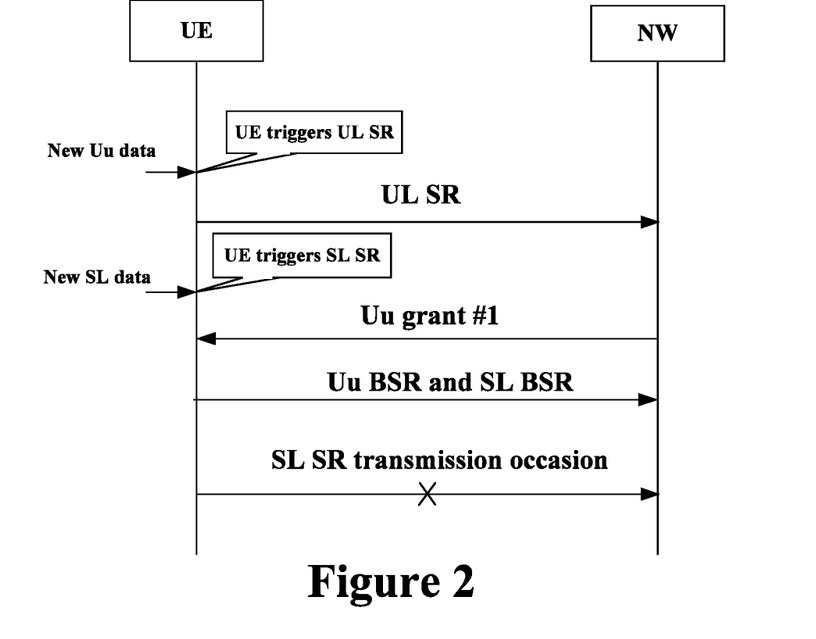
FIG. 2 is a schematic signaling chart showing the schematic messages according to the embodiments herein.

FIG. 2 is a schematic signaling chart showing the schematic messages according to the embodiments herein. The schematic signaling in FIG. 2 may be implemented in the example wireless communication system 100 of FIG. 1. For example, the wireless device 101 may transmit wireless signals to one or more of network nodes 102, and/or receive wireless signals from one or more of network nodes 102 by uplink (UL) via Uu interface. Meanwhile, the wireless device 101 may also transmit wireless signals to wireless device 103, and/or receive wireless signals from wireless device 103 via sidelink (SL).

As shown in FIG. 2, a triggered SL SR transmission should be cancelled before being transmitted if the relevant SL BSR has been transmitted already. Uu BSR is triggered when there is new Uu data, and Uu SR is sent to NW. Then UE gets new SL data, which triggers a SL BSR and SL SR, and receives the Uu grant #1 caused by the earlier Uu SR. In this case, UE may send SL BSR together with Uu BSR using Uu grant #1, and the planned SL SR will be cancelled.

Note that the Uu data and Uu SR in this example can also be SL data and SRs with different configuration, e.g. periodicity. In details, a first SL SR is triggered for requesting resource the first SL BSR, while a second BSR may be generated when the grant is received, the UE may transmit the second SL BSR instead if e.g. the second SL BSR is for more urgent traffic.

In another embodiment, when NW receives SL SR, especially when the SL SR reflects low latency requirement, NW provides not only Uu grant for SL BSR transmission but also SL grant for SL transmission. The size of the SL grant triggered by SL SR is such that is enough to enable transmissions for urgent/high priority SL transmissions.

Upon transmitting SL SR, the UE starts a SL SR prohibit timer. As long as the SL SR prohibit timer is running the UE is not allowed to transmit SL SR. At the expiry of the SL SR prohibit timer, the UE is allowed to retransmit a SL SR if not canceled yet. Upon reception of a SL grant, the SL SR is canceled otherwise it is considered pending. A SL SR which is pending, i.e. not canceled yet, can be retransmitted a certain amount of times, i.e. max_SR_attempts. Whenever a SL SR is retransmitted a SR_counter shall be stepped. Such SR_counter may be:

Common for all UL SR and SL SR transmissions, i.e. the SR counter stepped whenever a UL SR or SL SR is transmitted, and/or:

Dedicated for UL SR and SL SR, i.e. there is a UL_SR_counter which just counts the retransmissions of a pending UL SR, and a separate SL_SR_counter which just counts the retransmissions of a pending SL SR Similarly, the max_SR_attempts may be:

Common for all UL SR and SL SR transmissions. In this case upon reaching the maximum amount of SR transmission attempts, i.e. max_SR_attempts value, the UE performs random access and clear any configured UL/DL/SL grant. The UE also release any ongoing SL communication, e.g. it releases the SL radio bearer. Alternatively, the UE keeps the ongoing SL communication and starts using mode-2 SL resources for transmitting the SL data, i.e. the UE performs autonomous SL resource selection from the mode-2 resource pool Dedicated for UL SR and SL SR.
Upon reaching max_UL_SR_attempts, the UE triggers random access and clear any configured UL/DL/SL grants.
Upon reaching the max_SL_SR_attempts, the UE does not trigger random access, rather it just clears any configured SL grant and release any ongoing SL communication. Alternatively, the UE keeps the ongoing SL communication and starts using mode-2 SL resources for transmitting the SL data, i.e. the UE performs autonomous SL resource selection from the mode-2 resource pool.

In another embodiment, there is both a common max_SR_attempts to trigger random access and clear UL/DL grants, and a dedicated max_SL_SR_attempts to clear SL grant and release SL communication or switch to mode-2 functionality, as described above.

As shown above, the grant trigged by UL SR could be used to transmit SL BSR. In yet another embodiment, similarly the grant trigged by SL SR could also be used to transmit UL BSR.

SL BSR Related Embodiments

As shown in FIG. 2, after receiving the Uu grant, UE prepares transmission of Uu BSR, Uu data and SL BSR over UL. Regarding LCP improvements, the basic idea is to consider QoS/service type in LCP rather than statical LCP configuration. More specially:

When both UL and sidelink BSR are triggered and pending for transmission, which type of BSR to prioritize depends on the highest priority of the logical channel which belongs to any LCG included in the BSR. For instance:

The sidelink BSR is prioritized if the said priority is higher than that of the UL BSR, otherwise the UL BSR is prioritized. Or, The sidelink BSR is prioritized if the said priority is higher than a certain threshold_P_SL, otherwise the UL BSR is prioritized. Alternatively the UL BSR is prioritized if the said priority is higher than a certain threshold_P_UL, otherwise the sidelink BSR is prioritized The thresholds may be preconfigured or configured by the NW via common or dedicated signaling.

The two criteria may be used jointly, e.g. if the said priority for sidelink BSR and UL BSR are both higher or lower than the corresponding threshold, the sidelink BSR and UL BSR are prioritized based on relative comparison of the said priority as described above, otherwise they are prioritized based on comparison of the said priority with the corresponding threshold as described above.

In another embodiment, the other QoS requirement, such as the lowest latency requirement associated to the logical channel which belongs to any LCG included in the BSR, may also be considered. For instance:

The sidelink BSR is prioritized if the said latency requirement is lower than that of the UL BSR, otherwise the UL BSR is prioritized. Or, The sidelink BSR is prioritized if the said latency requirement is lower than a certain threshold_L_SL, otherwise the UL BSR is prioritized. Alternatively the UL BSR is prioritized if the said latency requirement is lower than a certain threshold_L_UL, otherwise the sidelink BSR is prioritized The thresholds may be preconfigured or configured by the NW via common or dedicated signaling.

The two criteria may also be used jointly, e.g. if the said latency requirement for sidelink BSR and UL BSR are both higher or lower than the corresponding threshold, the sidelink BSR and UL BSR are prioritized based on relative comparison of the said latency requirement as described above, otherwise they are prioritized based on comparison of the said latency requirement with the corresponding threshold as described above.

In yet another embodiment, the priority and latency criteria may be considered jointly, for instance:

It could be (pre)configured that the priority criteria always takes precedence over the latency criteria or vice versa. For instance, suppose the priority criteria takes precedence, and the said priority for sidelink BSR and UL BSR is equal, the sidelink BSR and UL BSR are then prioritized according to the latency criteria. If the said latency requirement for the sidelink BSR and the UL BSR are still the same, the sidelink BSR and the UL BSR should be transmitted with equal probability.

Or the priority criteria takes precedence over the latency criteria if the said priority for either sidelink BSR or UL BSR, or both, are higher than the corresponding threshold, optionally at the same time the said latency requirement for either sidelink BSR or UL BSR, or both, are higher than the corresponding threshold. Otherwise the latency criteria takes precedence.

Besides, that separate SR resources and configurations are supported for UL and sidelink in NR Sidelink Mode 1. Due to the delay between SR is triggered until the grant (for transmitting BSR) is received, it could be happen that a sidelink/UL SR is triggered and sent, while a UL/sidelink BSR is (also) generated before the grant is received, in this case, instead of always using the grant triggered by the sidelink/UL SR to transmit the corresponding sidelink/UL BSR, the sidelink and the UL BSR could first be prioritized according to above criteria, and the grant is used to transmit the prioritized BSR, which could be either sidelink BSR or UL BSR.

The above criteria could equally be applied to the following LCP scenarios:
  Prioritization between sidelink BSR with exception of sidelink BSR included for padding and UL data from any Logical Channel except data from UL-CCCH.
  Prioritization between UL BSR with exception of UL BSR included for padding and UL data from any Logical Channel except data from UL-CCCH.

Besides, currently Sidelink BSRs are cancelled when upper layers configure autonomous resource selection (i.e. mode 2 or mode 4), but this is not suitable when simultaneous mode 1 and mode 2 transmission are configured. Instead, the Sidelink BSRs should/could be cancelled only when upper layers de-configure NW controlled resource selection (i.e. mode 1 or mode 3). This may be performed per MAC entity, e.g. the Sidelink BSRs corresponding to a sidelink MAC entity are cancelled when the sidelink MAC entity is no more scheduled by the NW.

Figure 3:
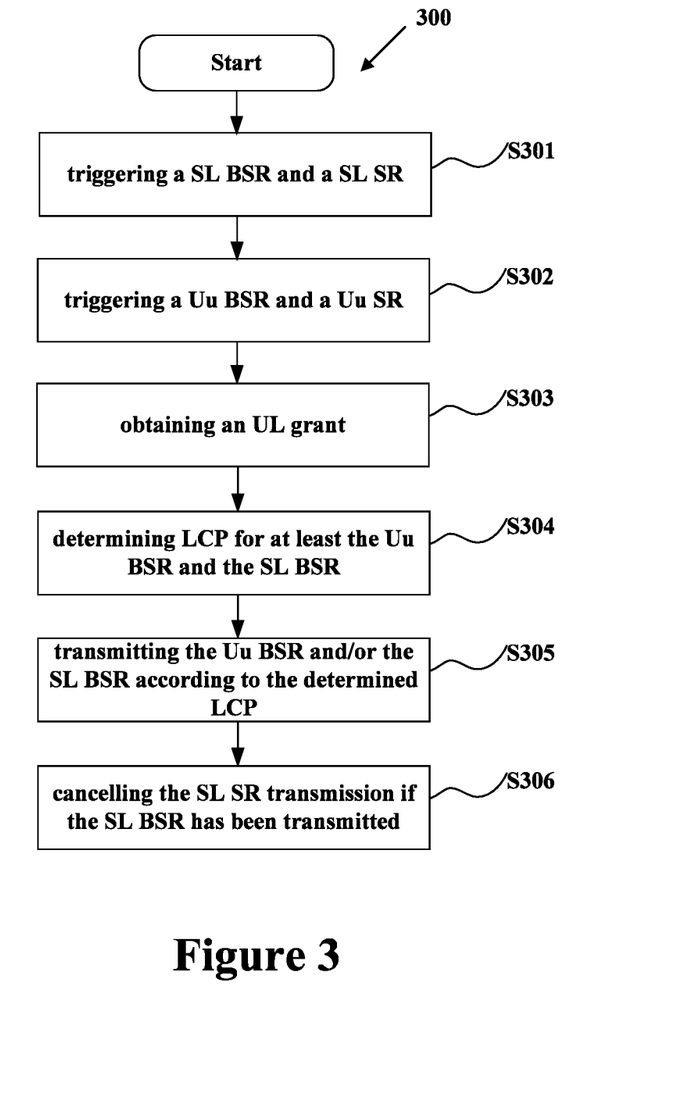
FIG. 3 is a schematic flow chart showing an example method, according to the embodiments herein.

FIG. 3 is a schematic flow chart showing an example method 300, according to the embodiments herein. In one embodiment, the flow chart in FIG. 3 can be implemented in the wireless device 101 in FIG. 1. In one embodiment, the method may be implemented as a method in a wireless device, comprising: triggering a Sidelink (SL) Buffer Status Report (BSR) in response to data to be sent over the SL; triggering a Sidelink (SL) Scheduling Request (SR) for transmitting the SL BSR, wherein the SL BSR is intended to be transmitted by using a first uplink (UL) grant triggered by the SL SR; and cancelling the SL SR transmission if the SL BSR has been transmitted by using a second UL grant triggered by other sources.

The method 300 may begin with step S301, in which the wireless device 101 may trigger a Sidelink (SL) Buffer Status Report (BSR) in response to data to be sent over the SL; and trigger a Sidelink (SL) Scheduling Request (SR) for transmitting the SL BSR, wherein the SL BSR is intended to be transmitted by using a first uplink (UL) grant triggered by the SL SR.

Then, the method 300 may proceed to step S302, in which the wireless device 101 may trigger a uplink (UL) Buffer Status Report (BSR) (UL BSR or Uu BSR) in response to data to be sent over the Uu link; and trigger a Uplink (UL) Scheduling Request (SR) (UL SR or Uu SR) for transmitting the Uu BSR, wherein the Uu BSR is intended to be transmitted by using a second uplink (UL) grant triggered by the Uu SR.

Note that, the above steps S301 and S302 may be perform in any manner, for example, performed in any sequence, performed at the same time, or performed separately.

Then, the method 300 may proceed to step S303, in which the wireless device 101 may obtain an UL grant. In one embodiment, the UL grant may be the first UL grant triggered by the SL SR or the second UL grant triggered by the Uu SR. As recited in embodiments in combination with FIG. 2, the Uu BSR and/or the SL BSR may be transmitted in this UL grant.

Then, the method 300 may proceed to step S304, in which the wireless device 101 may determine Logical Channel Prioritization (LCP) for at least the Uu BSR and the SL BSR. In one embodiment, the wireless device 101 may determine LCP for at least the Uu BSR and the SL BSR in any manner shown in connection to FIG. 2.

In one embodiment, the LCP is determined based on Quality of Service (QoS) requirement of the Uu BSR and the SL BSR. In one embodiment, the QoS requirement includes priority requirement and/or latency requirement.

In one embodiment, the QoS requirement of the Uu BSR is the highest QoS requirement of the logical channels included in the Uu BSR; and the QoS requirement of the SL BSR is the highest QoS requirement of the logical channels included in the SL BSR. For example, the priority of the Uu BSR is the highest priority of a plurality of logical channels included in the Uu BSR; and the priority of the SL BSR is the highest priority of a plurality of logical channels included in the SL BSR.

In one embodiment, the SL BSR is prioritized than the Uu BSR if the QoS requirement of the SL BSR is higher than the QoS requirement of the Uu BSR.

In one embodiment, the SL BSR is prioritized than the Uu BSR if the QoS requirement of the SL BSR is higher than a threshold. In one embodiment, the threshold is preconfigured or configured by a network node via common or dedicated signalling.

Then, the method 300 may proceed to step S305, in which the wireless device 101 may transmit the Uu BSR and/or the SL BSR according to the determined LCP. In one embodiment, the wireless device 101 may transmit the SL BSR by using the second UL grant triggered by the Uu SR. Instead, the wireless device 101 may transmit the SL BSR and the Uu BSR has been transmitted together by using the second UL grant triggered by the Uu SR. In one embodiment, the SL SR may be transmitted in the second UL grant. In one embodiment, the Uu SR may be transmitted in the second UL grant. In one embodiment, the SL SR together with the Uu SR may be transmitted in the second UL grant.

Then, the method 300 may proceed to step S306, in which the wireless device 101 may cancel the SL SR transmission if the SL BSR has been transmitted by using the second UL grant triggered by other sources.

Instead, the SL SR is transmitted without being cancelled, and the SL BSR and/or the Uu BSR is transmitted by using the first UL grant triggered by the Uu SR. In details, in one embodiment, the SL SR may be transmitted in the first UL grant. In one embodiment, the Uu SR may be transmitted in the first UL grant. In one embodiment, the SL SR together with the Uu SR may be transmitted in the first UL grant.

In one embodiment, the Uu data and Uu SR in this example can also be SL data and SRs with different configuration, e.g. periodicity. In one embodiment, the SL BSR may be transmitted by using a third UL grant triggered by a second SL SR with a different configuration.

The above steps are only examples, and the wireless device 101 can perform any actions (e.g., the above mentioned SR and/or BSR handling) described in connection to FIG. 2, to handle the SL SR/BSR.

Figure 4:
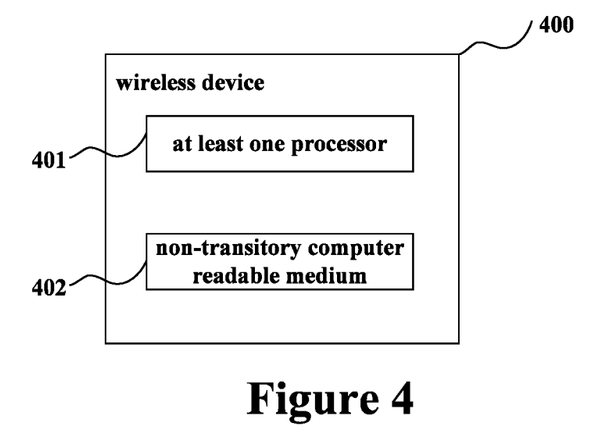
FIG. 4 is a schematic block diagram showing an example wireless device, according to the embodiments herein.

FIG. 4 is a schematic block diagram showing an example wireless device 400, according to the embodiments herein. In one embodiment, the wireless device 400 in FIG. 4 can be implemented as the wireless device 101 in FIG. 1.

In one embodiment, the wireless device 400 may include at least one processor 401; and a non-transitory computer readable medium 402 coupled to the at least one processor 401. The non-transitory computer readable medium 402 contains instructions executable by the at least one processor 401, whereby the at least one processor 401 is configured to perform the steps in the example method 300 as shown in the schematic flow chart of FIG. 3; the details thereof is omitted here.

Note that, the wireless device 400 can be implemented as hardware, software, firmware and any combination thereof. For example, the wireless device 400 may include a plurality of units, circuities, modules or the like, each of which can be used to perform one or more step of the example method 300 or one or more step (e.g., the above mentioned SR and/or BSR handling) shown in FIG. 2 related to the wireless device 101.

Figure 5:
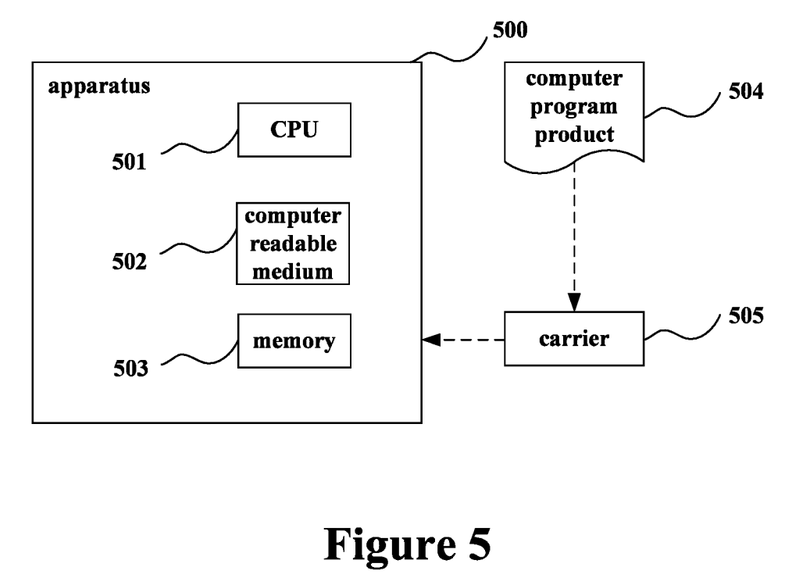
FIG. 5 is a schematic block diagram showing an apparatus, according to the embodiments herein.

FIG. 5 is a schematic block diagram showing an apparatus 500, according to the embodiments herein. In one embodiment, the apparatus 500 can be configured as the above mentioned apparatus, such as the wireless device 101 in FIG. 1.

In one embodiment, the apparatus 500 may include but not limited to at least one processor such as Central Processing Unit (CPU) 501, a computer-readable medium 502, and a memory 503. The memory 503 may comprise a volatile (e.g. Random Access Memory, RAM) and/or non-volatile memory (e.g. a hard disk or flash memory). In one embodiment, the computer-readable medium 502 may be configured to store a computer program and/or instructions, which, when executed by the processor 501, causes the processor 501 to carry out any of the above mentioned methods.

In one embodiment, the computer-readable medium 502 (such as non-transitory computer readable medium) may be stored in the memory 503. In another embodiment, the computer program can be stored in a remote location for example computer program product 504 (also can be embodied as computer-readable medium), and accessible by the processor 501 via for example carrier 505.

The computer-readable medium 502 and/or the computer program product 504 can be distributed and/or stored on a removable computer-readable medium, e.g. diskette, CD (Compact Disk), DVD (Digital Video Disk), flash or similar removable memory media (e.g. compact flash, SD (secure digital), memory stick, mini SD card, MMC multimedia card, smart media), HD-DVD (High Definition DVD), or Blu-ray DVD, USB (Universal Serial Bus) based removable memory media, magnetic tape media, optical storage media, magneto-optical media, bubble memory, or distributed as a propagated signal via a network (e.g. Ethernet, ATM, ISDN, PSTN, X.25, Internet, Local Area Network (LAN), or similar networks capable of transporting data packets to the infrastructure node).

Example embodiments are described herein with reference to block diagrams and/or flowchart illustrations of computer-implemented methods, apparatus (systems and/or devices) and/or non-transitory computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the appended examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the following examples of embodiments and their equivalents, and shall not be restricted or limited by the foregoing detailed description.

Abbreviations

3G Third Generation of Mobile Telecommunications Technology
BSM Basic Safety Message
BW Bandwidth
BSR Buffer Status Report
CAM Cooperative Awareness Message
CBR Channel Busy Ratio
CSI Channel State Information DPTF Data Packet Transmission Format
D2D Device-to-Device Communication
DENM Decentralized Environmental Notification Message
DSRC Dedicated Short-Range Communications
eNB eNodeB
ETSI European Telecommunications Standards Institute
GNSS Global Navigation Satellite System
LTE Long-Term Evolution
NW Network
RS Reference Signals
TF Transport Format
SAE Society of the Automotive Engineers
UE User Equipment
V2I Vehicle-to-Infrastructure
V2P Vehicle-to-Pedestrian
V2V Vehicle-to-(vehicle) communication
V2X Vehicle-to-anything-you-can-imagine
SPS Semi Persistent Scheduling
DMRS Demodulation reference signals
OCC Orthogonal cover code
PDCCH Physical Downlink Control Channel
DBS Delay-Based Scheduler
MAC Medium Access Control
MAC CE MAC Control Element
PSBCH Physical Sidelink Broadcast Channel
PUSCH Physical Uplink Shared Channel
PUCCH Physical Uplink Control Channel
PDU Packet Data Unit
3GPP Third Generation Partnership Project
LCID Logical Channel Identity
MAC Medium Access Control
MAC CE Medium Access Control-Control Element
RRC Radio Resource Control
IP Internet Protocol
PPPP ProSe Per Packet Priority
ProSe Proximity Services
PRB Physical Resource Block
SA Scheduling Assignment
SL Sidelink
SPS Semi-Persistent Scheduling
UL Uplink
DL Downlink
LCG Logical Channel Group
SFN System Frame Number
TTI Transmission Time Interval
SCI Sidenlink Control Information
RA Resource Allocation
RSRP Reference Signal Received Power.

What is claimed is:

1. A method in a wireless device, comprising:
triggering a Sidelink (SL) Buffer Status Report (BSR) in response to availability of data to be sent over the SL;
triggering a SL Scheduling Request (SR) to obtain a first uplink (UL) grant for transmitting the SL BSR; and
cancelling the SL SR transmission in response to transmitting the SL BSR using a second UL grant triggered by a Uu SR triggered by a Uu BSR, the Uu BSR being triggered by availability of data to be sent over the Uu interface.

2. The method according to claim 1, further comprising transmitting the SL BSR and the Uu BSR together using the second UL grant triggered by the Uu SR.

3. The method according to claim 1, further comprising:
determining Logical Channel Prioritization (LCP) for at least one of the Uu BSR and the SL BSR; and
transmitting at least one of the Uu BSR or the SL BSR according to the determined LCP.

4. The method according to claim 3, wherein the LCP is determined based on a Quality of Service (QoS) requirement of the Uu BSR and the SL BSR, wherein the QoS requirement includes at least one of a priority requirement or a latency requirement.

5. The method according to claim 4, wherein the QoS requirement of the Uu BSR is a highest QoS requirement of logical channels included in the Uu BSR, and the QoS requirement of the SL BSR is a highest QoS requirement of logical channels included in the SL BSR.

6. The method according to claim 4, wherein the SL BSR is prioritized over the Uu BSR if the QoS requirement of the SL BSR is higher than the QoS requirement of the Uu BSR.

7. The method according to claim 4, wherein one of the following applies:
the SL BSR is prioritized over the Uu BSR if the QoS requirement of the SL BSR is higher than a threshold; or
the Uu BSR is prioritized over the SL BSR if the QoS requirement of the Uu BSR is higher than a threshold.

8. The method according to claim 7, wherein the threshold is preconfigured or configured by a network node via common or dedicated signalling.

9. The method according to claim 1, wherein the SL BSR and the Uu BSR are transmitted together using the second UL grant triggered by the Uu SR.

10. A wireless device, comprising:
at least one processor; and
a non-transitory computer readable medium coupled to the at least one processor, the non-transitory computer readable medium contains instructions executable by the at least one processor, whereby the at least one processor is configured to:
trigger a Sidelink (SL) Buffer Status Report (BSR) in response to availability of data to be sent over the SL;
trigger a Sidelink (SL) Scheduling Request (SR) to obtain a first uplink (UL) grant for transmitting the SL BSR; and
cancel the SL SR transmission in response to transmitting SL BSR using a second UL grant triggered by a Uu SR triggered by a Uu BSR, the Uu BSR being triggered by availability of data to be sent over the Uu interface.

11. The wireless device according to claim 10, wherein the at least one processor is further configured to transmit the SL BSR and the Uu BSR together using the second UL grant triggered by the Uu SR.

12. The wireless device according to claim 10, wherein the at least one processor is further configured to:
determine Logical Channel Prioritization (LCP) for at least one of the Uu BSR and the SL BSR; and
transmit at least one of the Uu BSR or the SL BSR according to the determined LCP.

13. The wireless device according to claim 12, wherein the LCP is determined based on a Quality of Service (QoS) requirement of the Uu BSR and the SL BSR, wherein the QoS requirement includes at least one of a priority requirement or a latency requirement.

14. The wireless device according to claim 13, wherein the QoS requirement of the Uu BSR is a highest QoS requirement of logical channels included in the Uu BSR, and the QoS requirement of the SL BSR is a highest QoS requirement of logical channels included in the SL BSR.

15. The wireless device according to claim 13, wherein the SL BSR is prioritized over the Uu BSR if the QoS requirement of the SL BSR is higher than the QoS requirement of the Uu BSR.

16. The wireless device according to claim 13, wherein one of the following applies:
- the SL BSR is prioritized over the Uu BSR if the QoS requirement of the SL BSR is higher than a threshold; or
- the Uu BSR is prioritized over the SL BSR if the QoS requirement of the Uu BSR is higher than a threshold.

17. The wireless device according to claim 16, wherein the threshold is preconfigured or configured by a network node via common or dedicated signalling.

18. The wireless device according to claim 10, wherein the SL BSR and the Uu BSR are transmitted together using the second UL grant triggered by the Uu SR.

19. A non-transitory, computer readable medium storing computer readable code, which when executed by at least one processor of an apparatus, causes the at least one processor to:
- trigger a Sidelink (SL) Buffer Status Report (BSR) in response to availability of data to be sent over the SL;
- trigger a Sidelink (SL) Scheduling Request (SR) to obtain a first uplink (UL) grant for transmitting the SL BSR; and
- cancel the SL SR transmission in response to transmitting SL BSR using a second UL grant triggered by a Uu SR triggered by a Uu BSR, the Uu BSR being triggered by availability of data to be sent over the Uu interface.

* * * * *

UNITED STATES PATENT AND TRADEMARK OFFICE
CERTIFICATE OF CORRECTION

| | |
|---|---|
| PATENT NO. | : 11,902,966 B2 |
| APPLICATION NO. | : 17/441494 |
| DATED | : February 13, 2024 |
| INVENTOR(S) | : Zhang et al. |

It is certified that error appears in the above-identified patent and that said Letters Patent is hereby corrected as shown below:

In the Specification

In Column 1, Line 39, delete "(PC5)" and insert -- (PC5). --, therefor.

In Column 2, Line 42, delete "padding" and insert -- padding; --, therefor.

In Column 3, Line 27, delete "BSR'" and insert -- BSR'. --, therefor.

In Columns 4 & 5, Lines 67 & 1-2, delete "In one embodiment, in the method, the threshold is preconfigured or configured by a network node via common or dedicated signalling." and insert the same on Column 5, Line 1, as a new paragraph.

In Column 7, Line 57, delete "(NB-IOT)" and insert -- (NB-IoT) --, therefor.

In Column 8, Line 35, delete "Over" and insert -- over --, therefor.

In Column 9, Line 25, delete "(MSR) radio" and insert -- (MSR) --, therefor.

In Column 9, Line 55, delete "VOIP" and insert -- VoIP --, therefor.

In Column 11, Line 7, delete "resource" and insert -- resource by --, therefor.

In Column 11, Line 42, delete "pool" and insert -- pool. --, therefor.

In Column 11, Line 59, delete "trigged" and insert -- triggered --, therefor.

In Column 11, Line 61, delete "trigged" and insert -- triggered --, therefor.

In Column 12, Line 3, delete "specially:" and insert -- especially: --, therefor.

Signed and Sealed this
Thirtieth Day of April, 2024

*Katherine Kelly Vidal*
Katherine Kelly Vidal
*Director of the United States Patent and Trademark Office*

CERTIFICATE OF CORRECTION (continued)
U.S. Pat. No. 11,902,966 B2

In Column 13, Line 4, delete "could be" and insert -- could --, therefor.

In Column 13, Line 61, delete "perform" and insert -- performed --, therefor.

In Column 17, Lines 32-33, delete "MAC Medium Access Control MAC CE Medium Access Control-Control Element".

In Column 17, Line 47, delete "Sidenlink" and insert -- Sidelink --, therefor.